Aug. 27, 1963  P. F. ROSSBACH  3,101,533
METHOD OF MANUFACTURING BRAKE SHOES
Filed Sept. 19, 1958
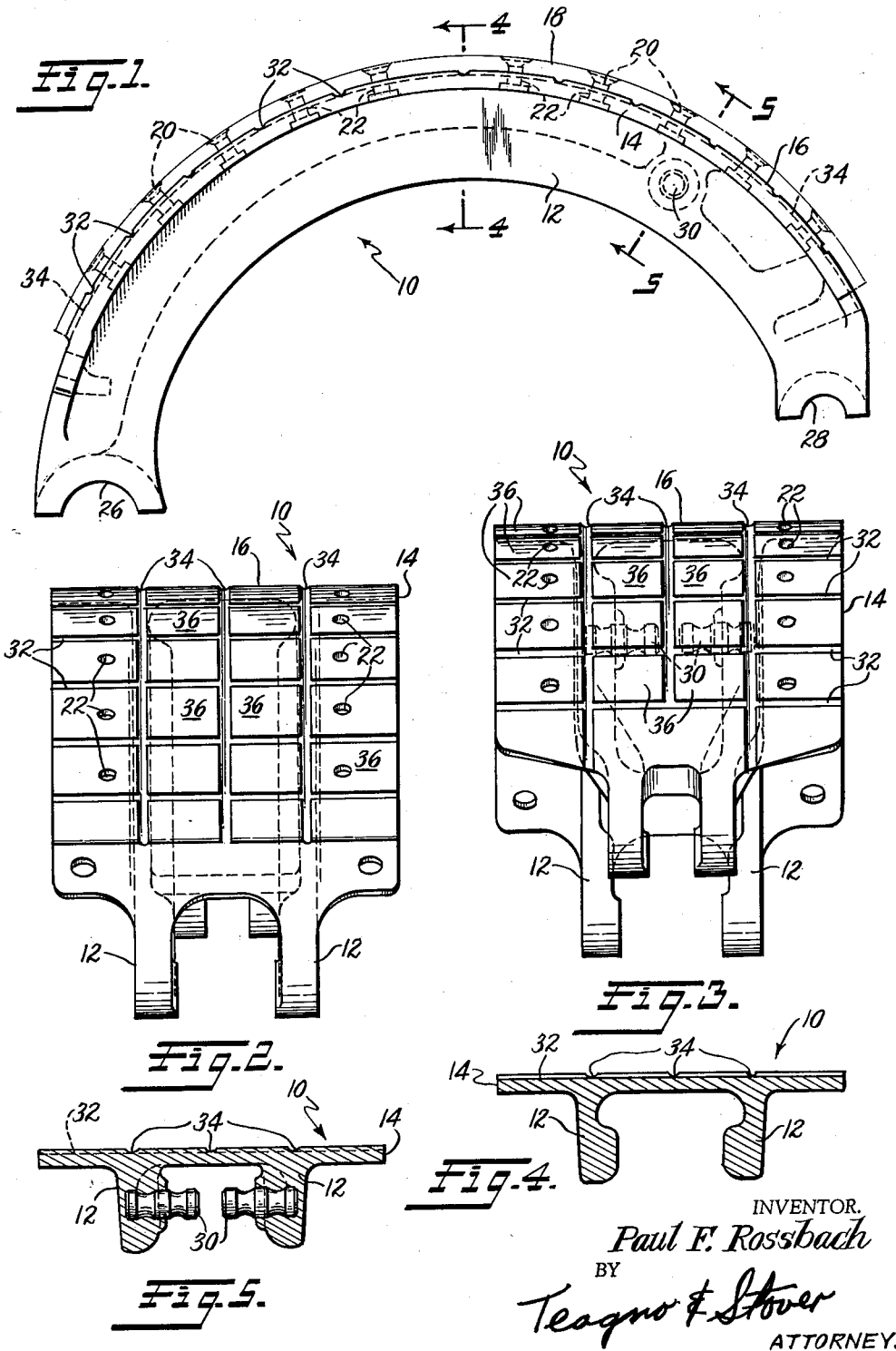
INVENTOR.
Paul F. Rossbach
BY
Teagno & Stover
ATTORNEYS

United States Patent Office 3,101,533
Patented Aug. 27, 1963

3,101,533
METHOD OF MANUFACTURING BRAKE SHOES
Paul F. Rossbach, Cleveland, Ohio, assignor to Eaton Manufacturing Company, Cleveland, Ohio, a corporation of Ohio
Filed Sept. 19, 1958, Ser. No. 762,002
4 Claims. (Cl. 29—552)

This invention relates to friction brakes, and deals more particularly with new and useful improvements in arcuate brake elements for supporting the friction material thereon, and with new and improved methods for manufacturing the brake element.

The improved brake element and the method for manufacturing the element of this invention are especially useful in, but not limited to, brakes of the internally expanding type, wherein the friction material supporting element is commonly in the form of a metallic shoe having an outer arcuate bearing surface and the friction material is in the form of a thin strip, or lining, riveted or bonded to the arcuate bearing surface of the shoe. In use, the brake shoe is moved slightly outwardly by a force applying member to bring the brake lining into contact with a rotating drum in order to stop or retard the movement of the drum. To achieve the greatest braking action from the brake shoe and lining, it is desirable that the unit pressure exerted between the brake lining and the rotating drum be substantially uniform over the entire surface area of the lining. If an uneven surface occurs on the brake lining the high spots thereof absorb an undue amount of the braking force applied to the brake shoe and the remainder of the brake lining area absorbs less than its appropriate portion of the braking force. As a result not only are the high spots subject to excessive wear, but the effectiveness of the brake in regard to total braking action may be seriously impaired.

One of the major causes of an uneven surface on the brake lining has been found to be an uneven supporting or bearing surface on the brake shoe. The outer shoe surface which supports the friction materal should be truly arcuate or cylindrical. In the past, however, it has been difficult to provide such a supporting or bearing surface on the brake shoe and instead, the resulting surface is usually somewhat warped or rough with dished out areas therein. Because of this warped or rough surface the friction material lining fixed to the brake shoe is only partially supported thereby and after a relatively small amount of use the brake lining will deform sufficiently to conform to the contour of the supporting or bearing surface of the brake shoe so that high spots in the brake shoe results in corresponding high spots in the brake lining.

In order to overcome such difficulties and to provide a smooth friction material supporting surface on such brake element, it has been found desirable to provide an interrupted brake shoe surface having sufficient area extent to enable excessive material to be displaced by permanent deformation through a force, such as a coining operation, with the resulting supporting or bearing surface being within a desired tolerance without requiring an additional machining operation, such as grinding, etc.

It is the primary object of this invention to provide a friction material supporting element blank with an interrupted surface of such configuration that sufficient material is available to enable the material to be displaced by permanent deformation to define a desired bearing surface area on the finished element for supporting a friction material which may be secured thereto.

An object of this invention is to provide a brake shoe blank having a plurality of outwardly projecting areas spaced from each other by a plurality of intersecting substantially continuously extending grooves so that the material of the areas may be easily displaced from the areas into the adjacent grooves by a permanent deformation so that the surface of each area will cooperate with the other surface areas to provide a uniform support for a brakelining.

Another object of this invention is to provide a friction material supporting element in which the surface which supports the friction material is so conformed to assure a given, known and maximum bearing surface to support the friction material while, at the same time, the surface further provides for cooling the friction material and also prevents slippage between the friction material and the supporting element.

Another object of the invention is to provide an improved brake shoe having an arcuate bearing surface containing a plurality of intersecting grooves which divide the surface into a plurality of separate areas with each of the areas forming a portion of the arcuate bearing surface for supporting a corresponding portion of a brake lining with certain parts of the grooves being spaced from the brake lining to form air passages therebetween to aid in heat dissipation and other parts of the grooves providing space into which a small portion of the brake lining may flow to provide an engagement between the brake lining and the brake shoe for preventing undesired circumferential or lateral movement therebetween.

An additional object of this invention is a method for manufacturing a friction material supporting element by first providing the element with a surface having a plurality of spaced outwardly projecting portions and thereafter displacing the material of the portions by the permanent deformation thereof into the space therebetween to create a bearing surface of desired configuration for supporting a friction material that may be secured to the supporting element.

A further object of this invention is a method for manufacturing a brake shoe by first forming a brake shoe blank with an arcuate surface having a plurality of outwardly projecting portions separated by a plurality of intersecting grooves and thereafter displacing the material of the outwardly projecting portions by a permanent deformation thereof to form a desired arcuate bearing surface on the finished brake shoe.

A still further object of this invention is a method of providing a friction material supporting element with a bearing surface by forming an element blank with a plurality of spaced areas having substantial surface extent and then deforming each of the areas to provide a surface, free of warpage or dished out areas, with each area being adapted to cooperate with the surfaces of the other areas to provide a uniform support for a friction material which may be secured to the element.

A still further object of this invention is a method of providing a brake shoe with an arcuate bearing surface for supporting a brake lining of friction material thereon so that the arcuate bearing surface may be easily formed, without expensive machining operations, into smooth, truly cylindrical areas for engaging and supporting the brake lining.

In accordance with the invention, a metallic brake shoe, or other metallic friction material supporting element, is formed, in blank as by casting, with an outer portion defining a surface against which the friction material, or lining, will bear. A plurality of intersecting grooves are provided in this surface so as to divide the surface into a number of spaced outwardly projecting areas each having substantial surface extent. By a suitable die, or the like, pressure is then applied to the areas in order to smooth out any irregularities therein with the metal from the areas flowing into the adjacent grooves during this operation. As a result of the displacement of the metal from each area by the permanent deformation thereof the resulting configuration of the surface extent of each area will conform to that of the die. The flowed metal does not, however, completely fill the grooves, so that the grooves remain in the brake lining supporting or bearing surface of the completed brake shoe to form air passages between the lining and the brake shoe for cooling purposes and recesses for receiving a small portion of the brake lining to prevent slippage between the brake lining and the brake shoe.

Other objects and important features of the invention will be apparent from a study of the specification following taken with the drawing which illustrate and describe a preferred embodiment of the invention and what is now considered to be the best mode of practicing the principles thereof. Other embodiments of the invention may be suggested to those having the benefit of the teaching herein, and such other embodiments are intended to be reserved especially as they fall within the scope of the subjoined claims.

Referring now to the drawing, wherein there is shown a preferred embodiment of the invention:

FIGURE 1 is a side elevational view of a brake shoe embodying the principles of and manufactured in accordance with the method of this invention;

FIGURE 2 is an end elevational view showing the brake shoe of FIG. 1 as viewed from the left-hand side with the brake lining removed;

FIGURE 3 is an end elevational view showing the brake shoe of FIG. 1 as viewed from the right-hand side with the brake lining removed;

FIGURE 4 is a sectional view taken on the line 4—4 of FIG. 1, with the lining removed; and FIGURE 5 is a sectional view taken on the line 5—5 of FIG. 1, with the lining removed.

Attention is now directed to FIG. 1 of the drawing wherein there is illustrated a friction material supporting element 10 in the form of an arcuate brake shoe for use in a friction brake of the internally expanding type. The brake shoe 10 includes axially spaced radially disposed circumferentially extending webs 12—12 and a circumferentially arcuately curved flange 14 which extends circumferentially along and axially between the webs 12—12 and for some distance axially or laterally outwardly on either side thereof, as seen best in FIGS. 4 and 5. The flange 14 has a circumferentially or longitudinally arcuate outer supporting or bearing surface 16 to which a strip of friction material 18, such as a brake lining, may be secured by securing means 20, such as a plurality of rivets or the like, which pass through holes 22 in the flange 14 and registering holes 24 in the brake lining 18. One end portion of each of the webs 12—12 is provided with a curved bearing surface 26 for engaging a pivot pin, not illustrated, of the brake mechanism while the other end portion of each of the webs 12—12 is provided with another curved bearing surface 28 through which the braking force from a force applying means, such as a hydraulic piston or the like, not illustrated, is applied. Intermediate the two end portions of each web 12 there is also provided a grooved pin 30, note FIG. 5, to which a resilient return means, such as a spring or the like, not illustrated, may be attached to bias the brake shoe 10 into a normal retracted or inoperative position.

As contemplated by the invention, the arcuate outer bearing surface 16 of the flange 14 is interrupted and waffled by providing a plurality of intersecting, substantially continuous, grooves 32—34 which divide the bearing surface 16 into a number of separate, radially outwardly projecting portions or upstanding areas 36 each having a substantial surface extent both longitudinally and laterally of the bearing surface 16. In the modification illustrated, the plurality of generally parallel grooves 32 are longitudinally or circumferentially spaced along the flange 14 and extend generally laterally or axially substantially the full extent of the arcuate outer bearing surface 16, with the other grooves 34 being spaced generally laterally or axially of the flange 14 and extend generally longitudinally or circumferentially therealong substantially the full length of the arcuate outer bearing surface 16. As a result of the grooves 32—34, the outer bearing surface 16 is divided into the plurality of projecting portions or areas 36 which are disposed in generally aligned series of generally rectangular configuration and of substantially equal surface extent, giving the waffled appearance to the outer bearing surface 16. It is to be understood, however, that any other arrangement of grooves 32—34 could be used in practicing the invention so long as the outer bearing surface 16 is divided thereby into a plurality of spaced areas 36 of substantial surface extent. For example, the grooves could divide the outer surface into a plurality of triangles, diamonds, rhombuses, or other straight sided figures, or even, if desired, the areas could be circles, elliptical or of other curved configuration.

The provision of grooves or the separation of the areas or lands in only one direction will not accomplish the objects of this invention because the total value of such grooves or spacing below and adjacent the projecting areas or lands which define the arcuate bearing surface of the shoe is not great enough, in most instances, to receive all of the displaced material from the surface areas in order to maintain a constant radius of curvature since the material of such surface will be displaced in all directions. Also, it is believed to be obvious that in an area or land defined by only uni-directional grooves or spaces, it is necessary to displace portions of the material a much greater distance than in a structure having grooves disposed at an angle to each other or intersecting which surround and isolate the surface areas or lands. Further, by providing the arcuate surface with a plurality of isolated individual projecting areas, metal can be readily displaced throughout the entire perimeter of each of the areas to thus create and maintain a constant radius of curvature.

Although it is of great importance to maintain a constant radius of curvature on the outer arcuate surface of the brake shoe, it is also important to keep the dimensions of the grooves or spacing between the projecting areas or lands to a minimum so that the ratio of the projecting area to the depressed area is as high as possible. For example, it has been found in practicing this invention that for a friction material receiving shoe surface having an arcuate length of approximately 16 in. and an axial width of approximately 5⅞ in. which would be cooperable with a 15 in. diameter brake drum that it would be suitable to provide grooves or spacing between the areas or lands of a mean depth of 1/32 in. and a mean width of 5/32 in. with such grooves or spacing being disposed in space intervals which divide the surface into areas or lands which measure approximately 1¼ in. by 1⅜ in. It is to be understood that these dimensions are merely one suitable embodiment which establish a practical ratio which may be varied, if desired, and that this example does not, in any way, restrict the inventive concept to these specific dimensional relationships.

The provision of the outwardly projecting portions or lands 36 enables several useful and desired results to occur. First, there is brought about a unique cooperation between the brake shoe 10 and the brake lining 18 with the lands 36 of the bearing surface 16 contacting the brake lining 18 along substantially equal supporting areas each of which engage a corresponding portion of the brake lining. Simultaneously, while the lands 36 are supporting the brake lining 18, the grooves 32 and 34 have parts thereof which are spaced from the brake lining 18 to provide air passageways for circulating cooling air into intimate contact with the brake lining 18 and flange 14 to dissipate the heat generated during use. Also, as seen in FIG. 1, when the brake lining 18 is secured to the brake shoe 10, a small amount of the lining material may flow into other parts of the grooves 32 and 34 thus giving a bite between the brake lining 18 and the brake shoe 10 which aids in preventing slippage therebetween.

The invention also contemplates manufacturing the brake shoe 10 by a new and improved method requiring relatively few operations, whereby the outer arcuate bearing surface 16 of the flange 14 may be formed as described and disclosed above, i.e. smooth, truly cylindrical surface free from irregularities to a degree hitherto unavailable except by the use of difficult machine operations. In this method, the brake shoe 10 is first rough formed from metal by any suitable manner, such as casting, into blank form. The grooves 32 and 34 are preferably formed in the bearing surface 16 of the flange 14 during the same operation by which the brake shoe is rough formed, that is, for example, if the brake shoe 10 is cast, the grooves 32 and 34 are provided for by the mold and become part of the blank casting produced by the mold. It will be understood, however, that the grooves could be formed by a separate operation, if desired. The major portion of the blank for the brake shoe 10 is in a satisfactory condition for use, however, the arcuate outer bearing surface 16 defined by the isolated areas or lands 36 is generally somewhat irregular and, due to uncontrollable shrinkage of the material during the brake shoe blank forming operation, the texture of the molding material, or other factors, the surface 16 of the blank will contain dished out areas or will be warped so as not to be truly smooth and cylindrical.

In order to obtain a smooth outer arcuate bearing surface 16, the material of the flange 14 is therefore subjected to permanent deformation, by a suitable operation, sufficient to displace the metal adjacent the outer surface 16 and redistribute the same in a desirable manner so that the areas or lands 36 will terminate in a common surface. This step may be accomplished by a coining operation in which smooth dies conforming to the desired finished bearing surface are pressed with great force against the projecting portions or areas 36 to cause the metal thereof to be displaced and arranged thereby as required to overcome the irregularities in the surface extent of the areas or lands 36 and provide a smooth, cylindrical finished bearing surface 16. The grooves 32 and 36 in this operation serve to receive metal from the areas or lands 36 which otherwise would be trapped between the flange 12 and the dies making impossible or very difficult the deformation operation. It has been found that techniques, presently available, enable the brake shoe blank to be formed to a close tolerance so that a minimum amount of metal deformation and displacement is necessary and further, that the deformation step enables the brake shoe to be manufactured without the necessity of other expensive machining operations, such as grinding, etc.

While the invention has been described in terms of a preferred embodiment thereof its scope is intended to be limited only by the claims here appended.

I claim as my invention:

1. The method of manufacturing a metallic brake shoe comprising, first forming a brake shoe blank with an arcuate surface having a plurality of intersecting grooves some of which extend in substantially a first direction and others of which extend in substantially a second direction, thus defining a plurality of areas separated by said grooves throughout substantially the full extent of the arcuate surface and thereafter permanently deforming the areas by displacing a portion of the metal thereof into the grooves adjacent thereto to provide an arcuate bearing surface for the brake shoe.

2. The method of manufacturing a brake shoe comprising, first providing an arcuate surface of a brake shoe blank with a plurality of intersecting grooves some of which extend in substantially a first direction and others of which extend in substantially a second direction thus defining a plurality of areas separated by said grooves and thereafter displacing the material of the areas by permanently deforming the surface to provide an arcuate bearing surface of desired configuration on the brake shoe.

3. The method of providing an arcuate bearing surface on a brake shoe, said method including the steps of forming a brake shoe blank with an arcuate surface having a plurality of grooves some of which extend in substantially a first direction and others of which extend in substantially a second direction, thus defining areas that are each surrounded entirely by said grooves and thereafter deforming the areas by permanently displacing a portion of the material therefrom into an adjacent groove to form the surface extent thereof into a desired arcuate configuration.

4. The method of providing a brake shoe with an arcuate bearing surface, said method including the steps of forming a brake shoe blank with a surface having a plurality of groove means extending in substantially a first direction, further groove means intersecting said first mentioned groove means to define a plurality of spaced areas of substantial surface extent and thereafter displacing a portion of the material from the areas into the adjacent grooves to remove any irregularities in the surface thereof and thus form the arcuate bearing surface for the brake shoe.

References Cited in the file of this patent

UNITED STATES PATENTS

| | | |
|---|---|---|
| 1,493,211 | Link | May 6, 1924 |
| 1,667,375 | Dodge | Apr. 24, 1928 |
| 1,715,806 | Wersall | June 4, 1929 |
| 1,784,865 | Fahrenwald | Dec. 16, 1930 |
| 1,860,375 | Winterer et al. | May 31, 1932 |
| 1,943,198 | White | Jan. 9, 1934 |
| 1,955,367 | Hall | Apr. 17, 1934 |
| 2,015,829 | White | Oct. 1, 1935 |
| 2,166,157 | Jones et al. | July 18, 1939 |
| 2,438,483 | Tack | Mar. 23, 1948 |
| 2,647,592 | Tilden | Aug. 4, 1953 |
| 2,840,196 | Lignian | June 24, 1958 |
| 2,871,557 | Jarmann et al. | Feb. 3, 1959 |
| 2,871,996 | Strebinger | Feb. 3, 1959 |